(12) United States Patent
Ahn et al.

(10) Patent No.: US 6,449,234 B1
(45) Date of Patent: Sep. 10, 2002

(54) DISK PLAYER LOADING A DISK WITH IMPROVED INSERTION AND LOADING

(75) Inventors: Cheol-woong Ahn, Seoul; Young-pyo Lee, Yongin; Tae-won Park, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/221,119

(22) Filed: Dec. 28, 1998

(30) Foreign Application Priority Data

Dec. 31, 1997 (KR) ............................................. 97-82109
Dec. 31, 1997 (KR) ............................................. 97-82112
Dec. 31, 1997 (KR) ............................................. 97-82115

(51) Int. Cl.[7] .............................................. G11B 17/04
(52) U.S. Cl. ..................................................... 369/77.1
(58) Field of Search ................................ 369/77.1, 75.2

(56) References Cited

U.S. PATENT DOCUMENTS

| | | | | |
|---|---|---|---|---|
| 4,498,162 A | * | 2/1985 | Schatterman | 369/77.1 |
| 4,546,396 A | * | 10/1985 | Schatteman | 360/96.5 |
| 4,677,607 A | * | 6/1987 | Ejiri | 369/77.1 |
| 4,682,320 A | * | 7/1987 | d'Arc | 369/77.1 |
| 4,864,551 A | | 9/1989 | Tomita et al. | 369/36 |
| 4,969,140 A | * | 11/1990 | Koiwa et al. | 369/77.1 |
| 4,979,160 A | * | 12/1990 | Araki | 369/75.2 |
| 5,054,016 A | * | 10/1991 | d'Alayer et al. | 369/270 |
| 5,136,570 A | * | 8/1992 | Takai et al. | 369/77.1 |
| 5,166,917 A | * | 11/1992 | Decoster et al. | 369/77.1 |
| 5,173,894 A | * | 12/1992 | Kido | 369/77.1 |
| 5,204,849 A | * | 4/1993 | Yamada et al. | 369/75.2 |
| 5,255,255 A | * | 10/1993 | Kaneda et al. | 369/77.1 |
| 5,416,763 A | * | 5/1995 | Ohsaki | 369/77.1 |
| 5,493,551 A | * | 2/1996 | Kido | 369/77.1 |
| 5,544,148 A | * | 8/1996 | Nakamichi | 369/192 |
| 5,737,293 A | * | 4/1998 | Kawamura et al. | 369/77.1 |
| 5,872,757 A | * | 2/1999 | Park | 369/77.1 |
| 6,016,299 A | * | 1/2000 | Ishige | 369/75.2 |
| 6,028,831 A | * | 2/2000 | Scholz et al. | 369/75.2 |
| 6,058,097 A | * | 5/2000 | Inoue | 369/192 |
| 6,167,015 A | * | 12/2000 | Jeong et al. | 369/77.1 |
| 6,192,019 B1 | * | 2/2001 | Kurokawa et al. | 369/75.2 |
| 6,198,713 B1 | * | 3/2001 | Sakurai et al. | 369/77.1 |
| 6,330,216 B1 | * | 12/2001 | Nishimura et al. | 369/77.1 |

FOREIGN PATENT DOCUMENTS

JP          62-7659          1/1987

* cited by examiner

Primary Examiner—Brian E. Miller
(74) Attorney, Agent, or Firm—Staas & Halsey LLP (57) ABSTRACT

A disk player includes contact members accommodating and supporting a disk at a predetermined position in a main body of the disk player. The contact members are in contact with the outer peripheral surface of the disk and the contact members are transferred to load the disk supported thereto into a clamping position, which is advantageous to miniaturizing the disk player and protecting the disk.

20 Claims, 9 Drawing Sheets

DISK PLAYER LOADING A DISK WITH IMPROVED INSERTION AND LOADING

CROSS-REFERENCE TO RELATED APPLICATIONS

This application claims the benefit of Korean Application Nos. 97-82109, filed Dec. 31, 1997; 97-82112, filed Dec. 31, 1997; and 97-82115, filed Dec. 31, 1997, in the Korean Patent Office, the disclosures of which are incorporated herein by reference.

BACKGROUND OF THE INVENTION

1. Field of the Invention

The present invention relates to a disk player, and more particularly, to a disk player with improved structure for disk insertion and loading.

2. Description of the Related Art

A disk player reproduces information recorded on a disk such as a compact disk (CD) and a digital versatile (or video) disk (DVD). The disk player includes a clamping mechanism for clamping a disk loaded into a main body thereof, a spindle motor for rotating the clamped disk, and an optical pickup for irradiating light beams onto the disk so as to read the information from the disk rotated by the spindle motor. The clamping mechanism generally includes a turntable for mounting the loaded disk thereon and a chuck for clamping the disk together with the turntable.

According to disk loading methods or disk types, a disk player is classified into various types. For example, for disk loading methods loading a disk to a position at which the disk can be clamped by a clamping mechanism incorporated into a main body of the disk player, the disk player is largely classified into two types. In one of the two types, a disk is inserted into a main body of the disk player by means of a tray capable of moving into and out of the main body. In another of the two types, a disk is directly inserted and loaded into the main body through a disk entrance provided in the main body without a disk tray.

In the disk player constructed such that the disk is directly inserted through the disk entrance without a disk tray, a device having a pair of rollers for carrying the disk using friction established with the disk while rotating in a pressed state at both sides of the disk has been employed to load the disk into a clamping position or to unload the loaded disk.

However, in the disk player employing the rollers for loading/unloading the disk, since the rollers having a predetermined diameter must be parallel to each other and installed perpendicular to a disk insertion direction, it is difficult to miniaturize the disk player. Also, since the rollers are configured to carry the disk while rotating while pressed against both sides of the disk, damage may be applied to a recording layer on the disk due to friction between the rollers and the disk.

SUMMARY OF THE INVENTION

To solve the above problem, an object of the present invention is to provide a disk player with improved structure, by which a disk can be loaded and/or unloaded, without being in contact with a recording layer on the disk and which is advantageous for miniaturization.

Additional objects and- advantages of the invention will be set forth in part in the description which follows and, in part, will be obvious from the description, or may be learned by practice of the invention.

To achieve the above-mentioned object and other objects, of the present invention, a disk player includes a pair of first contact members installed in a main body of the disk player including a clamping device which clamps a disk such that the pair of first contact members gets closer to or more distant from each other and moves in a direction away from each other by being pressed by the outer peripheral surface of the front portion of the disk inserted into the main body of the disk player. The disk player of the present invention also includes elastic mechanism that elastically biases the first contact members in a direction in which they are closer to each other, so that the disk is accommodated at a first position in the disk player main body by pressing the outer peripheral surface of the rear portion of the disk while the first contact members get closer to each other after being moved away from each other. Further, the disk player of the present invention includes a second contact member being in contact with the outer peripheral surface of the front portion of the disk accommodated at the first position, for supporting the disk at the first position together with the first contact members. In addition, the disk player of the present invention includes disk loading/unloading means for moving the first and second contact members, for loading the disk supported at the first position into a second position at which the disk is to be clamped by the clamping device and/or unloading the disk positioned at the second position into the first position.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Reference will now made in detail to the present preferred embodiment of the present invention, examples of which are illustrated in the accompanying drawings, wherein like reference numerals refer to the like elements throughout. The embodiment is described below in order to explain the present invention by referring to the figures.

Figure 1:
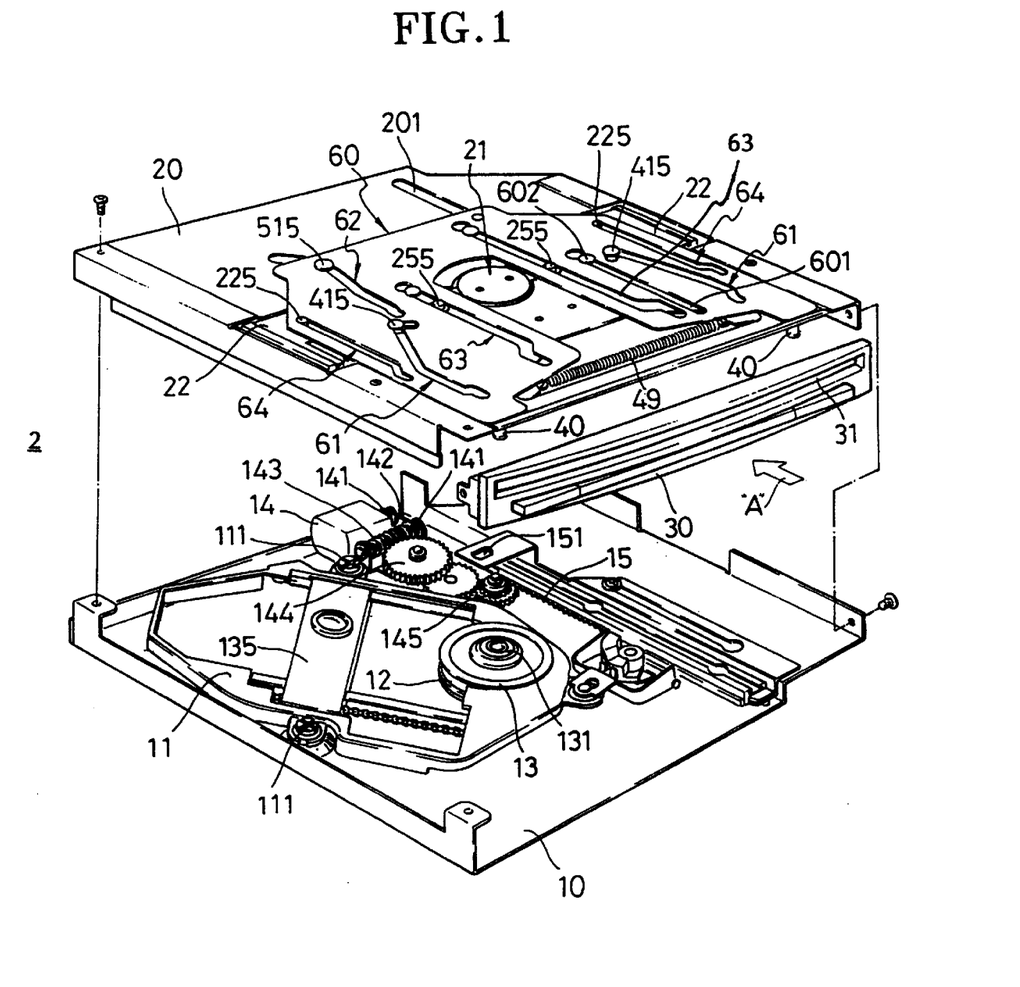
FIG. 1 is a schematic exploded view illustrating a disk player according to the present invention.
Figure 2:
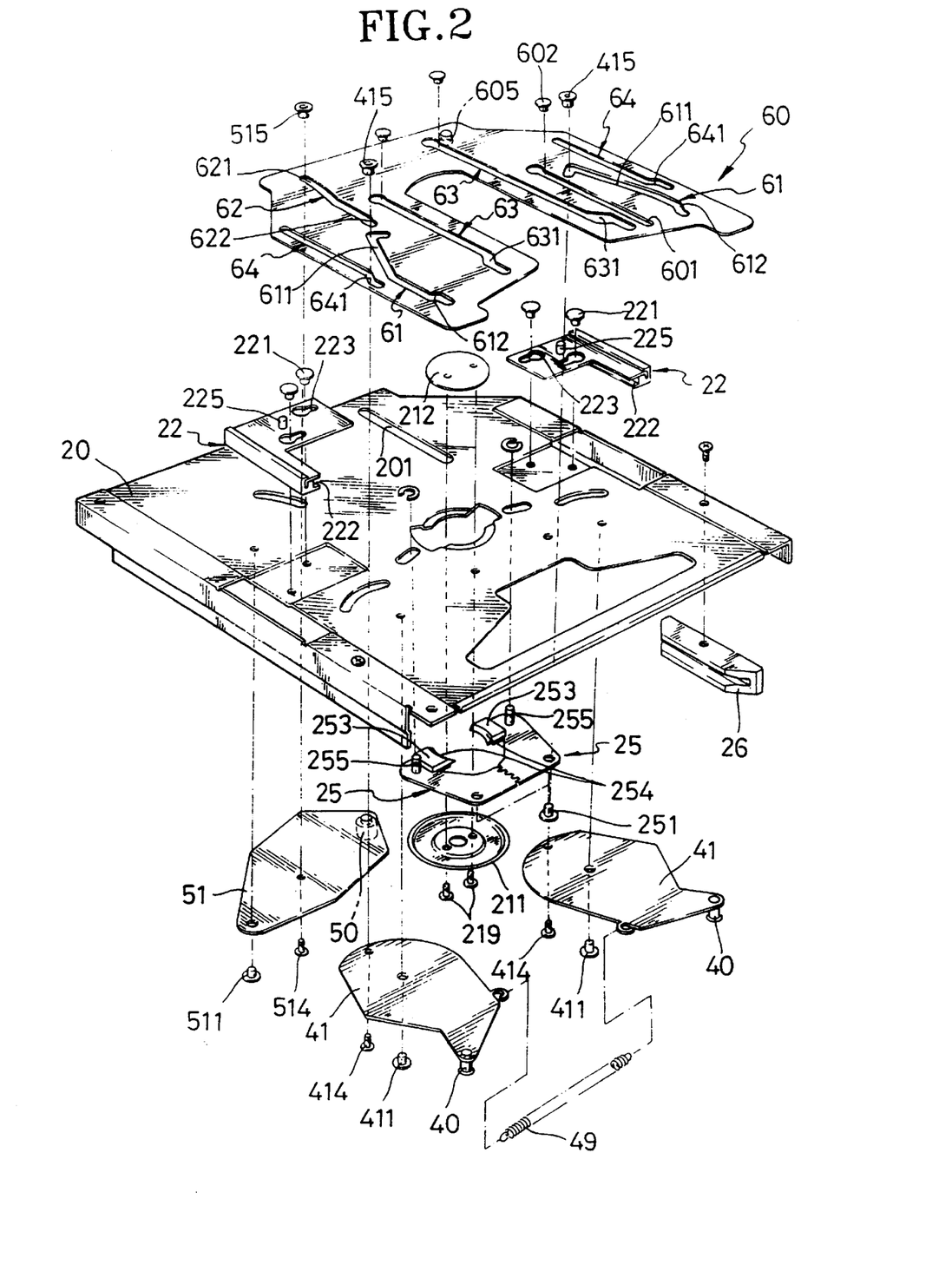
FIG. 2 is a schematic exploded perspective view illustrating a cover portion shown in FIG. 1.

Referring to FIGS. 1 and 2, a disk player 2 includes a disk player main body comprising a base 10, a cover 20 and a front panel 30.

In the base 10, a deck 11 is installed to seesaw around a hinge point 111. The deck 11 includes a spindle motor 12. A turntable 13 is fixed on the output shaft of the spindle motor 12. A magnet 131 is fixed on the turntable 13. In the deck 11, an optical pickup 135 is installed and is slidable toward or away from the turntable 13. The optical pickup 135 irradiates light beams into a disk 1 (shown in FIG. 3) to read information recorded on the disk 1.

The cover 20 coupled with the upper portion of the base 10 protects elements installed in the base 10 such as the turntable 13 and the optical pickup 135, and, together with the base 10, functions as a casing having a space for insertion of the disk 1. The front panel 30 installed in front of the casing constructed by the base 10 and the cover 20 includes a disk entrance 31 allowing the disk 1 to move into and out of the casing.

On the cover 20, a guide slot 201 is elongated in a disk insertion direction, as indicated by arrow "A". A chuck 21 which clamps the disk 1 together in cooperation with the turntable 13 is also provided on the cover 20. The chuck 21 is installed at a position corresponding to the turntable 13 on the deck 11 so as to be movable up and down by a predetermined height. The chuck 21 includes a magnetic pressing portion 211 positioned under the cover 20 and a stopper 212 positioned above the cover 20 and fixed to the pressing portion 211 by a screw 219, as shown in FIG. 2.

Together, the chuck 21 and the turntable 13 provide a clamping device in the main body of the disk player 2. The clamping device clamps the inserted disk 1 by the clamping mechanism described.

Also, a pair of wedge members 25 are rotatably coupled to the cover 20 around a hinge shaft 251 fixed on the cover 20. The wedge members 25 are geared to each other so that when one is rotated, the other is also rotated. At free ends of the respective wedge members 25, an advancing portion 253 is provided which moves inside between the stopper 212 of the chuck 21 and the cover 20 or moves away therefrom. A sloping portion 254 is provided in the advancing portion 253 to facilitate the advancing operation. Before the disk 1 is loaded, the advancing portion 253 moves inside between the stopper 212 of the chuck 21 and the cover 20, thereby preventing the chuck 21 from descending. Inside both side walls of the cover 20, a pair of guide rails 26 are fixed.

In the disk player 2 shown in FIGS. 1 and 2, the disk 1 is inserted into the main body of the disk player 2 through the disk entrance 31 formed on the front panel 30 into a first position in the disk player main body. To accommodate the insertion of the disk 1 into the first position, the disk player 2 of the present invention thus constructed further includes a pair of first contact members 40, elastic mechanism (such as spring 49 explained in further detail herein below), and a second contact member 50.

The first contact members 40 are fixed, respectively, on a pair of first rotating members 41. Each of the first rotating members 41 is coupled to the cover 20 to rotate on a plane parallel to the disk insertion direction (A) around a hinge shaft 411 rotatably fitted into the first rotating members 41 and fixed on the cover 20. The first contact members 40 move away from each other while rotating the respective rotating members 40 when the first contact members 40 are pressed by the outer circumferential surface of the front portion of the disk 1 inserted into the disk player main body through the disk entrance 31 in the disk insertion direction (A). Also, each of the first contact members 40 is positioned on a free end of each of the corresponding first rotating members 41. Accordingly, the pair of the first contact members 40 move closer or more distant from each other by rotation of the first rotating members 41.

The elastic mechanism elastically biases the first contact members 40 to remain closer to each other. In the embodiment of the present invention shown in FIGS. 1 and 2, a spring 49 having both ends supported by the respective first rotating members 41 is provided as such elastic mechanism. The first rotating members 41 are elastically biased in a direction in which free ends of the first rotation members 41 are closer to each other. Finally, the first contact members 40 are also elastically biased in a direction in which the first contact members 40 are closer to each other.

The second contact member 50 is fixed on a second rotating member 51. The second rotating member 51 is coupled to the cover 20 to rotate on a plane parallel to the disk insertion direction (A) and around a hinge shaft 511. A second contact member 50 is fixed on a free end of the second rotating member 51 rotatably fitted into the second rotating member 51 and fixed on the cover 20. The second contact member 50 is positioned at a free end of the second rotating member 51. Accordingly, the second contact member 50 can move by rotation of the second rotating member 51.

The disk 1 inserted into the disk player main body through the disk entrance 31 is accommodated and supported at a first position in the disk player main body by the first contact members 40, the spring 49 and the second contact member SO, which are described herein below.

As disk loading/unloading means for loading the disk 1 supported at the first position by the first contact members 40 and the second contact member 50 into a second position at which the disk 1 is to be clamped by the clamping mechanism and/or unloading the disk 1 at the second position into the first position, the disk player 2 according to the present embodiment also includes a slider 60 and a motor 14, together with the first rotating members 41 and the second rotating member 51.

The slider 60 includes a guide slot 601 elongated in the disk insertion direction (A) and a coupling protrusion 605 protruding downward and penetrating the guide slot 601 of the cover 20. The slider 60 is coupled slidably to the cover 20 in the disk insertion direction (A) and the opposite direction by a guide pin 602 slidably fitted into the guide slot 601 and fixed on the cover 20. The slider 60 also includes first cams 61 and a second cam 62.

In each of the first cams 61, a first guide pin 415 supported by each of the first rotating members 41 is slidably constrained by a screw 414. Also, each of the first cams 61 includes a sloping portion 611 sloping with respect to the disk insertion direction (A) so that the first guide pins 415 move while the slider 60 slides. Further, each of the first cams 61 includes an auxiliary sloping portion 612 sloping with respect to a different direction than the disk insertion direction (A).

In the second cam 62, a second guide pin 515 supported by the second rotating member 51 is slidably constrained by a screw 514. The second cam 62 includes a sloping portion 621 and an auxiliary sloping portion 622, sloping with respect to the disk insertion direction (A), so that the second guide pin 515 moves while the slider 60 slides.

In the disk player 2 of the present invention, the motor 14 is installed in the base 10, as shown in FIG. 1, and the output shaft of the motor 14 is connected to a worm 143 through a pulley 141 and a belt 142. A worm gear 144 is engaged with the worm 143, and the worm gear 144 is geared with a pinion 145. A rack 15, installed movably in the disk insertion direction (A) and the opposite direction, is engaged with the base 10. A coupling hole 151 coupled to the coupling protrusion 605 of the slider 60 is formed in the rack 15. Thus, when the motor 14 operates, the rotary force of the motor 14 is transferred to the pinion 145 through the pulley 141, the belt 142, the worm 143 and the worm gear 144. The rack 15 reciprocates by rotation of the pinion 145. When the rack 15 reciprocates, the slider 60 reciprocatively slides in the disk insertion direction (A) and the opposite direction through the coupling protrusion 605 coupled to the coupling hole 151 of the rack 15.

In the slider 60 of the disk player 2 according to the present embodiment of the invention, third cams 63 and a pair of guide member driving cams 64 are also provided.

In each of the third cams 63, a guide pin 255 supported by each of the wedge members 25 is slidably constrained. Each of the third cams 63 includes a sloping portion 631 sloping with respect to the disk insertion direction (A) so that the guide pins 255 of the wedge members 25 move while the slider 60 slides.

A guide member 22 guiding movement of the disk 1 while loading or unloading the disk 1 is coupled to each of the guide member driving cams 64. Each guide member 22 includes a guide hole 223 elongated in a direction perpendicular to the disk insertion direction (A). Each guide member 22 is supported by guide pins 221 so that each guide member 22 slides either closer to or away from the cover 20. The guide pins 221 are slidably fitted into a guide hole 223 and fixed on the cover 20. In each of the guide members 22, a guide slit 222 is elongated in the disk insertion direction (A) so that both edges of the loaded disk 1 are fitted thereinto. A guide pin 225 protruding upward is provided in each of the guide members 22. The guide pin 225 is slidably constrained in each of the guide member driving cams 64 of the slider 60. Each of the guide member driving cams 64 includes a sloping portion 641 sloping with respect to the disk insertion direction (A) so that the guide pins 225 of the guide members 22 move while the slider 60 slides.

Figure 3:
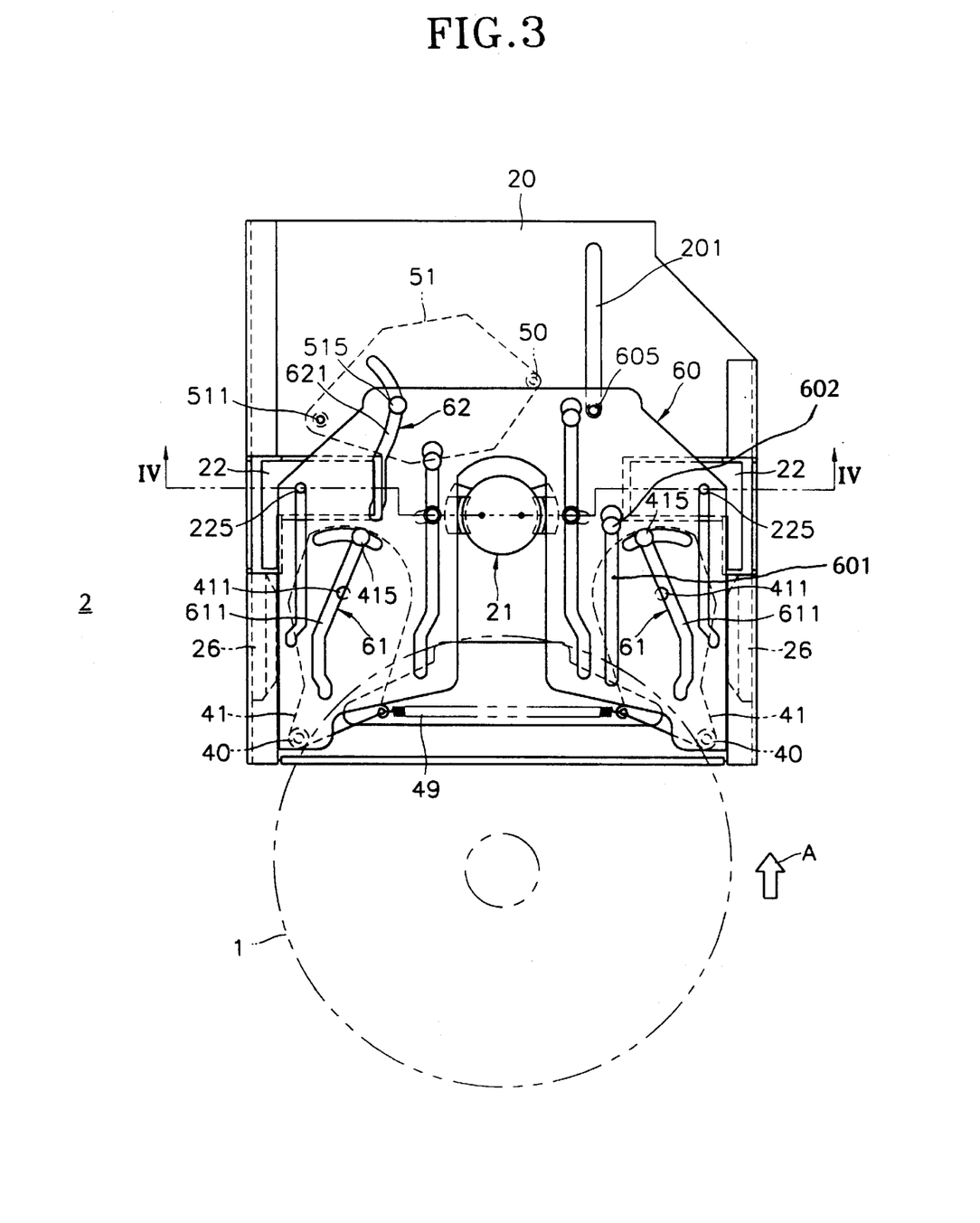
FIG. 3 is a schematic plan view illustrating the disk player shown in FIG. 1, in which a front panel is not shown for convenience.
Figure 4:
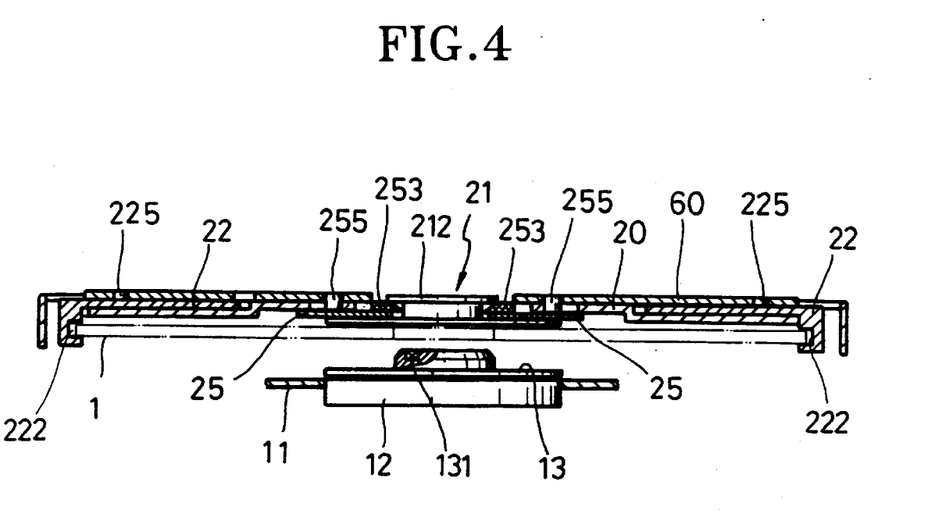
FIG. 4 is a schematic sectional view taken along line IV—IV of FIG. 3.

In the disk player 2 of the present invention thus constructed, when the disk 1 is inserted through the disk entrance 31 of the front panel 30 (shown in FIG. 1), as shown in FIG. 3, the outer peripheral surface of the front portion of the disk insertion direction (A) comes into contact with the first contact members 40. As shown in FIG. 4, the chuck 21 is lifted up because the advancing portions 253 of the wedge members 25 are inserted between the stopper 212 of the chuck 21 and the cover 20. Also, the guide members 22 are closer to each other so as to guide both edges of the disk 1 to be loaded.

Figure 5:
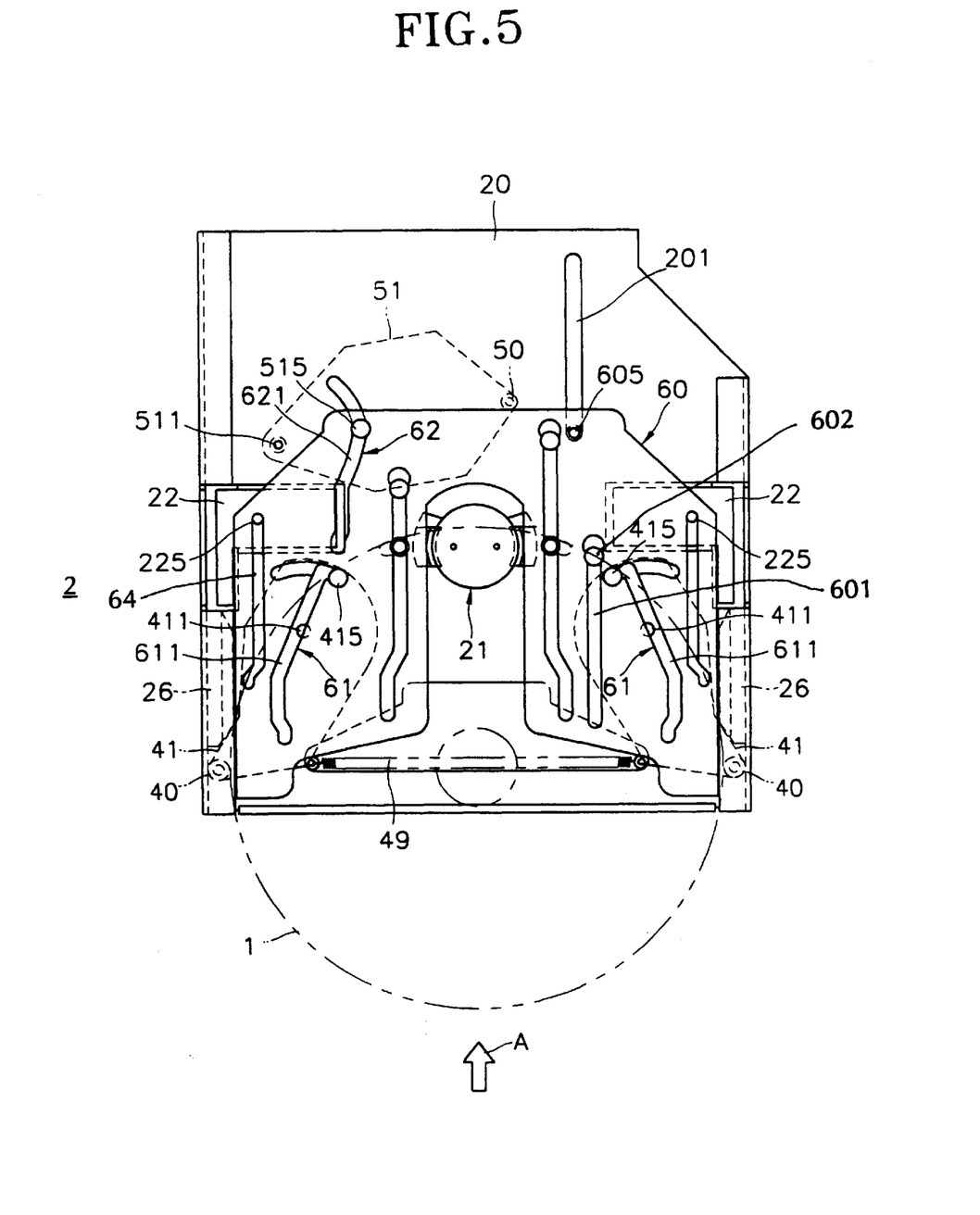
FIGS. 5 through 8 illustrate the procedure in which the disk shown in FIG. 3 is inserted into a first position and loaded into a second position to then be clamped.

If force is further applied to the disk 1 in the disk insertion direction (A) in a state in which the outer peripheral surface of the front portion of the disk insertion direction (A) is in contact with the first contact members 40, as shown in FIG. 3, the force is transferred to the first contact members 40 in a direction such that the distance between the first contact members 40 increases. Accordingly, as shown in FIG. 5, the first rotating members 41 rotate around a hinge shaft 411 by the transferred force until the first contact members 40 are moved away from each other and into a position at which they do not interfere with insertion of the disk 1, that is, until the distance between the first contact members 41 equals the diameter of the disk 1. While the first rotating members 41 rotate in such a manner, the spring 49 is tensile to have a restoration force.

Figure 6:
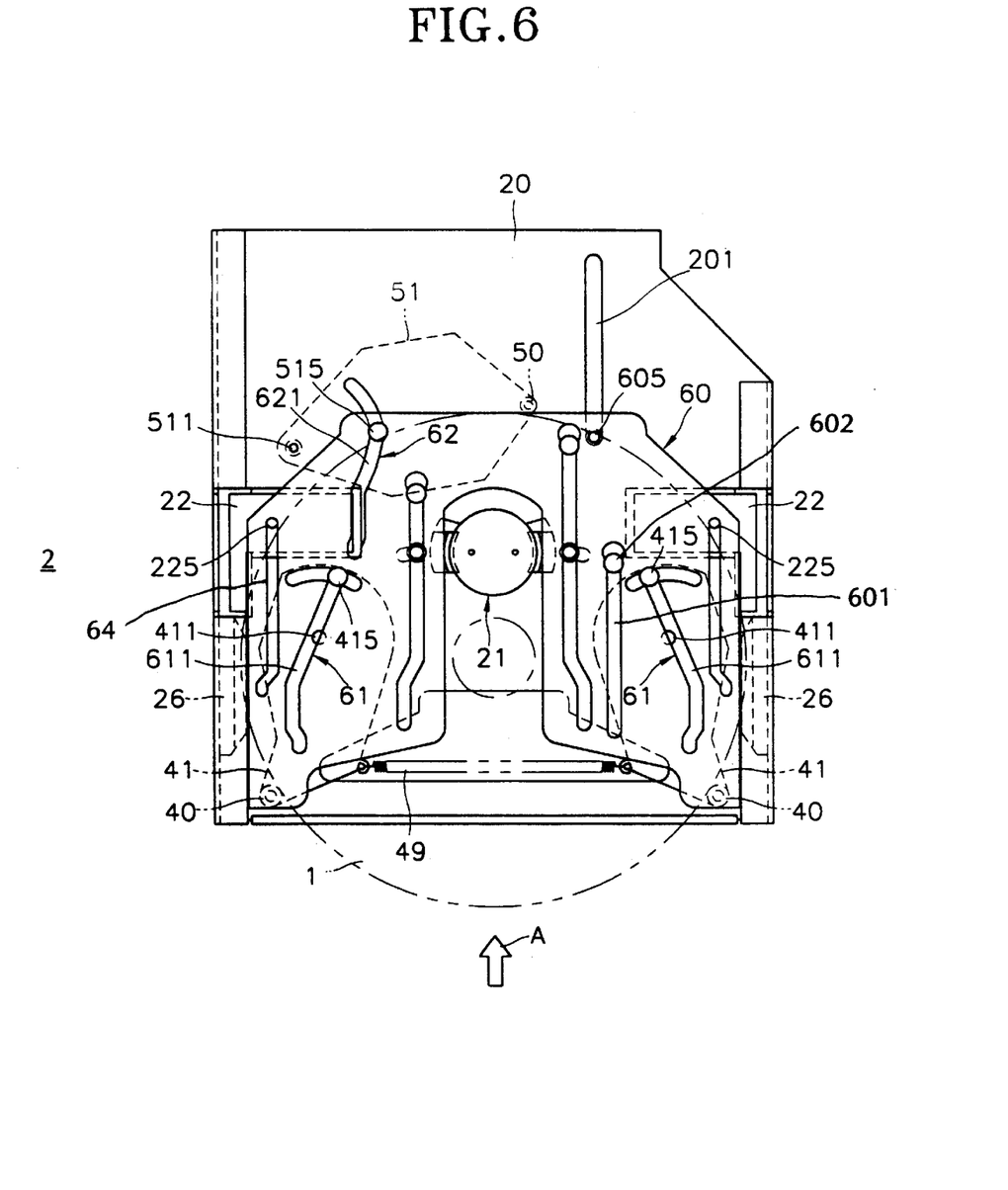

When the disk player 2 of the present invention is in the state as shown in FIG. 5, if the disk 1 is inserted further inward into the disk player 2, the first rotating members 41 rotate in a direction in which the first contact members 40 are closer to each other by the restoration force of the spring 49. Accordingly, the first contact members 41 fixed on the first rotating members 40 press the outer peripheral surface of the rear portion of the disk insertion direction (A) and then insert the disk 1 into the first position, as shown in FIG. 6. As shown in FIG. 6, both edges of the inserted disk 1 are slidably fitted by the guide rails 26 so that the disk insertion and movement are guided. Making use of the spring 49, when the disk 1 is inserted in the first position, the first contact members 40 elastically contact the rear portion of the disk 1 and the second contact member 50 elastically contacts the front portion of the disk 1 so that the disk 1 is supported in the first position.

To retrieve information stored on the disk 1 which is supported at the first position as shown in FIG. 6, the disk 1 is loaded into a second position by clamping using the turntable 13 (shown in FIGS. 1 and 2) and the chuck 21 (shown in FIG. 6).

The loading procedure of the disk 1 from the first position to the second position is now described.

Figure 7:
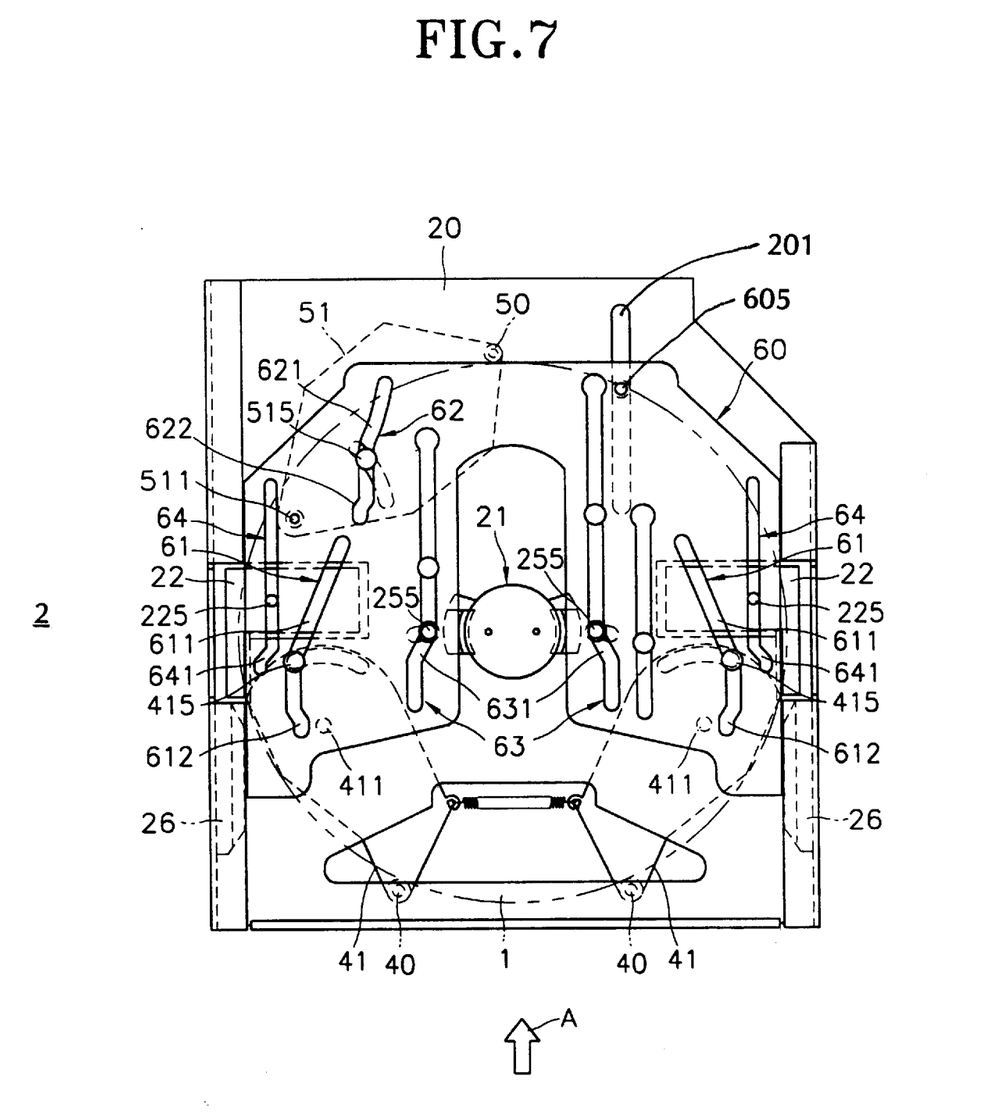

First, in the state shown in FIG. 6 in which the disk 1 is accommodated in the first position, if the rack 15 (shown in FIG. 1) is moved by the motor 14 (also shown in FIG. 1) in the disk insertion direction (A), the coupling protrusion 605 coupled to the coupling hole 151 of the rack 15 and the slider 60 on which the coupling protrusion 605 is fixed slide in the disk insertion direction (A), as shown in FIG. 7. While the slider 60 slides in such a manner, the first guide pins 415 constrained in the first cams 61 of the slider 60 move by the sloping portions 611 of the first cams 61 in a direction in which they get closer to each other.

During the above-mentioned procedure, the first rotating members 41, which support the first guide pins 415, rotate around the hinge shaft 411 in a direction in which they approach each other. Accordingly, the first contact members 40 also move in a direction in which they approach each other. The first contact members 40 approaching each other slide with respect to the outer peripheral surface of the rear portion of the disk 1 to press the disk 1 in the disk insertion direction (A), thus loading the disk 1 into the second position, that is, a clamping position at which the center of the disk 1 coincides with that of the chuck 21, as shown in FIG. 7. While the disk 1 is loaded into the second position by the first contact members 40, the second guide pin 515 moves by the sloping portion 621 of the second cam 62 to thus rotate the second rotating member 51 around the hinge shaft 511, thus moving the second contact member 50 fixed on the second rotating member 51 in a direction in which the second contact member 50 moves away from the disk 1. Therefore, while the disk 1 is loaded into the second position by the first contact members 40, the second contact member 50 avoids interference by the loading of the disk 1.

Figure 8:
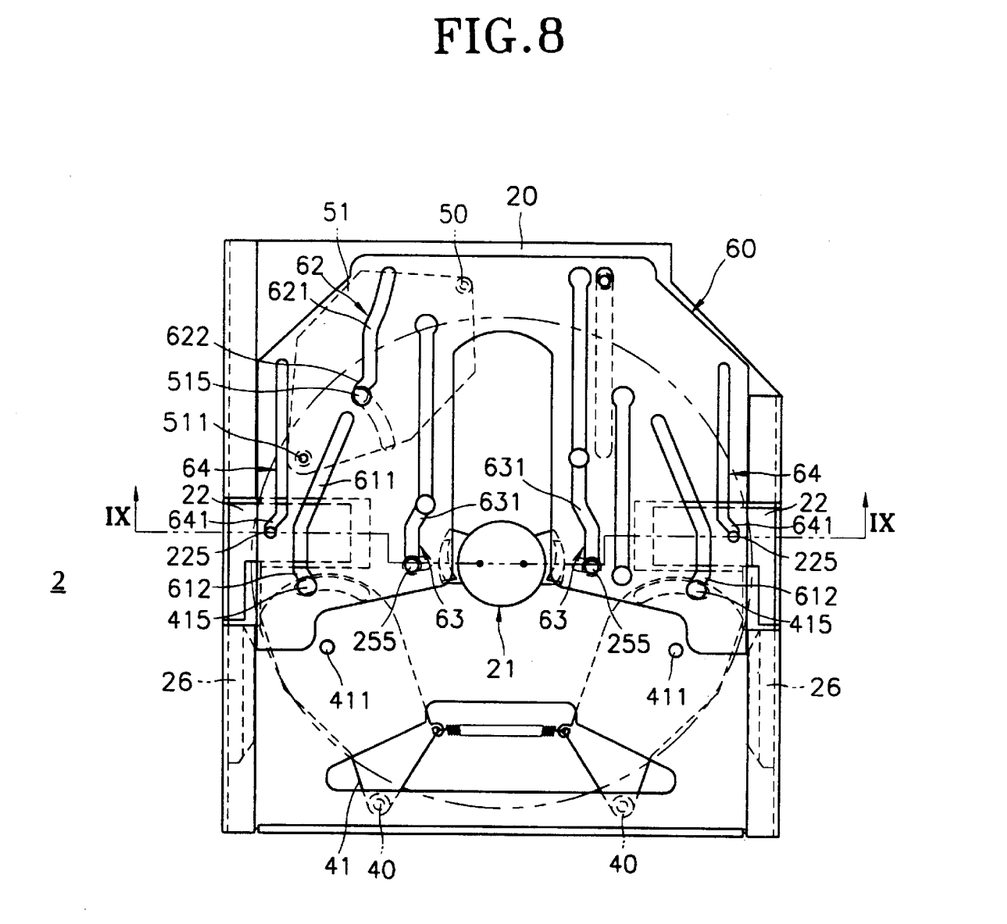

In the disk player 2 according to this embodiment of the present invention, even after the disk 1 is loaded into the second position, as shown in FIG. 7, the slider 60 keeps sliding in the disk insertion direction (A) by the motor 14 until it reaches the position shown in FIG. 8.

In the course of moving of the slider 60 from the position in which the loading of the disk 1 is completed, as shown in FIG. 7, to the position shown in FIG. 8, the first guide pins 415 move in a direction opposite to that when loading the disk 1 by the auxiliary sloping portions 612 of the first cams 61.

Accordingly, while the first rotating members 41 rotate, the first contact members 40 are moved away from the disk 1. The second guide pin 515 moves in the same direction as that when loading the disk 1 by the auxiliary sloping portion 622 of the second cam 62.

Accordingly, while the second rotating member 51 rotates, the second contact member 50 is moved away from the disk 1. Also, the guide pins 255 constrained in the guide member driving cams 64 of the slider 60 move by the sloping portions 641 of the guide member driving cams 64, so that the guide members 22 move away from each other.

Accordingly, the disk 1 whose both edges are supported by the guide members 22 is disengaged from the guide members 22 so as to be movable up and down. If both edges of the loaded disk 1 are guided by the guide members 22 getting closer to each other while loading the disk 1, and the guide members 22 are moved away from each other to be free from interference by the loaded disk 1 after loading the disk 1, the guide members 22 are not interfered with by the elevation of the disk 1 due to disk chucking (to be described herein below) even if there is no increase in the heights of the guide slits 222 (shown in FIG. 2) of the respective guide members 22.

In addition, the guide pins 255 constrained in the third cams 63 of the slider 60 move by the sloping portions 631 of the third cams 63, so that the wedge members 25 rotate in a direction in which the advancing portions 253 (shown in FIGS. 2 and 4) thereof are moved away from each other. Thus, the advancing portions 253 are moved away between the stopper 212 of the chuck 21 and the cover 20, so that the chuck 21 is movable up and down (as shown in FIG. 9).

In such a manner, if the chuck 21 is constructed such that the chuck 21 is lifted before loading the disk 1 and the chuck 21 is lowered after loading the disk 1, interference between the disk 1 and the chuck 21 is avoided, because the chuck 21 descends by its own weight while loading the disk 1.

Figure 9:
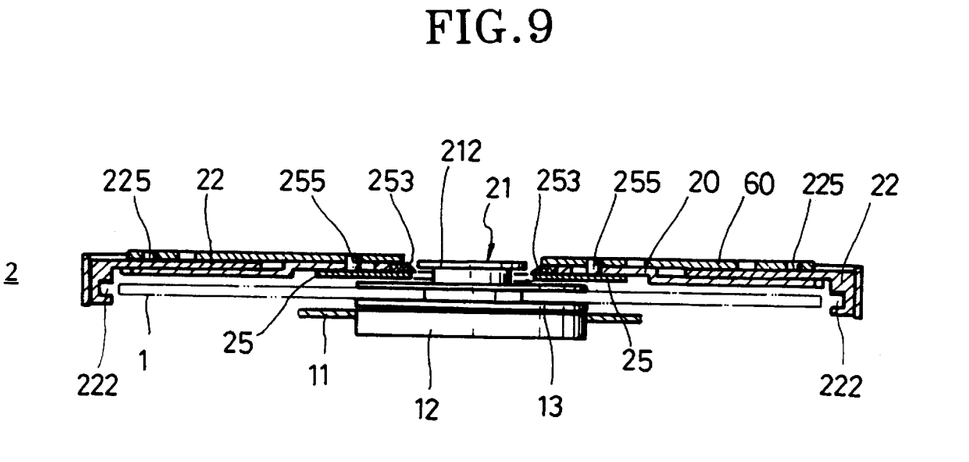
FIG. 9 is a schematic sectional view taken along line IX—IX of FIG. 8.

In a state of the present invention as shown in FIG. 8, when the deck 11 (shown in FIG. 1) rotates around the hinge point 111 to lift the turntable 13, the bottom portion of the disk 1 loaded as shown in FIG. 9 comes into contact with the turntable 13. Also, the chuck 21 is closely adhered to the top surface of the disk 1 by a magnetic force of the magnet 131 fixed on the turntable 13 to press the disk 1 on the turntable 13, thus clamping the disk 1 together with the turntable 13. The clamped disk 1 rotates with the turntable 13 and the chuck 21 by rotation of the spindle motor (12 of FIG. 1), and the information is read from the disk 1 by the optical pickup 135.

Disk unloading in the present invention is now described.

When the disk 1 is loaded into the second position, in the state shown in FIG. 7, and if the motor 14 operates in a direction opposite to that in which the disk 1 is loaded, the slider 60 slides in an unloading direction which is opposite to the disk insertion direction (A). When the slider 60 slides in the unloading direction from the state shown in FIG. 7, the second guide pin 515 constrained in the second cam 62 of the slider 60 moves by the sloping portions 621 of the second cam 62 to rotate the second rotating member 51. Accordingly, the second contact member 50, fixed on the second rotating member 51, slides into contact with the outer peripheral surface of the front portion of the disk 1, in view of the disk insertion direction (A), to press the disk 1 into the first position.

While the disk 1 is pressed into the first position by the second contact member 50, the first guide pins 415 move by the sloping portion 611 of the first cams 61 of the slider 60 to thus rotate the first rotating members 41, thus moving the first contact members 40 (which are fixed on the first rotating members 41) away from each other. Thus, while the disk 1 is pressed into the first position by the second contact member 50, it is unloaded and accommodated into the first position, as shown in FIG. 6, without being interfered with by the first contact members 40.

As described above, in the disk player 2 according to the present invention, the disk 1 can be accommodated to be supported at a first position in the disk player main body 1 by the first contact members 40 and the second contact member 50 contacting the outer peripheral surface of the disk 1. Thus, in the present invention, since members do not contact the recording plane of the disk 1, either during disk insertion or for disk support, damage to the recording plane of the disk 1 is prevented.

Also, the disk player 2 according to the present embodiment of the present invention loads and unloads the disk 1 by moving the first contact members 40 and the second contact member 50, without the necessity for predetermined diameter rollers required in the conventional disk player. For example, if the first rotating members 41, the second rotating member 51, and the slider 60 of the present invention are formed of thin metal plates or are formed thinly by plastic injection molding, the problem encountered in the conventional disk loading/unloading apparatus (that is, a difficulty in attaining a thin disk player due to the predetermined diameter rollers which must be provided in parallel to each other and installed perpendicular to the disk insertion direction) is overcome.

Although it has been described in the present embodiment of the present invention that the first and second contact members 40 and 50 are fixed on the first and second rotating members 41 and 51 rotatably installed in the cover 20, and move by rotation of the first and second rotating members 41 and 51, the present invention is not limited thereto. For example, the contact members may be fixed on plate-shaped members installed to be reciprocating linearly to then be movable by linear motion of the plate-shaped members. Further, there are alternate means for movably supporting the contact members with respect to the cover.

Also, the shapes of the first and second cams formed in the slider are not restricted to that shown in the accompanying drawings, but can be changed within the spirit and scope of the present invention according to the arrangement states of the rotating members.

As described above, the disk player according to the present invention is constructed such that a disk is accommodated and supported at a predetermined position in a main body of the disk player by contact members. The contact members are in contact with the outer peripheral surface of the disk and the contact members are transferred to load the disk supported thereto into a clamping position, which is advantageous to miniaturizing the disk player and protecting the disk.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disk player loading or unloading a disk having a front portion including an outer peripheral surface and a rear portion having an outer peripheral surface, the front portion being received by the disk player ahead of the rear portion during the loading of the disk, the disk player including a main body including a clamping device clamping the disk inserted into the main body, the disk player comprising:

a pair of first contact members installed in the main body of the disk player and being movable closer to each other and away from each other, said pair of first contact members being moved away from each other by being pressed by the outer peripheral surface of the front portion of the disk inserted into the main body of the disk player;

elastic means for elastically biasing said first contact members closer to each other, so that the disk is accommodated at a first position in the main body by pressing the outer peripheral surface of the rear portion of the disk while said first contact members get closer to each other after being moved away from each other;

a second contact member being in contact with the outer peripheral surface of the front portion of the disk accommodated at the first position, said second contact member supporting the disk at the first position together with said first contact members; and disk loading/unloading means for moving said first contact members and said second contact member, for loading the disk supported at the first position into a second position at which the disk is clamped by the clamping device, and for unloading the disk positioned at the second position into the first position, wherein each of said first contact members moves towards each other and moves around the outer peripheral surface of the disk as the disk moves to the first position due to said first contact members pressing against the outer peripheral surface of the rear portion of the disk.

2. The disk player according to claim 1, wherein the disk loading/unloading means comprises:

a pair of rotating members rotatably coupled to the main body, each said rotating member including a free end on which a respective one of said first contact members is fixed, a second rotating member rotatably coupled to the main body and including a free end on which said second contact member is fixed, a slider slidably installed with respect to the main body and including first cams coupled to said first contact members and a second cam coupled to said second contact member so that said first and second contact members move during sliding of the slider, and a motor sliding said slider.

3. The disk player according to claim 1, wherein said first and second contact members reciprocate on a plane parallel to a disk insertion direction.

4. The disk player according to claim 1, further comprising a pair of guide members installed in the main body, each guide member of said pair of guide members getting closer to or more distant from each other at both sides of a disk insertion direction, each guide member including a guide slit elongated in the disk insertion direction, each guide slit slidably fitting the edge of the disk, and each said guide member supporting the disk while said guide members get closer to each other.

5. A disk player loading or unloading a disk having a front portion including an outer peripheral surface and a rear portion having an outer peripheral surface, the front portion being received by the disk player ahead of the rear portion during the loading of the disk, the disk player including a main body including a clamping device clamping the disk inserted into the main body, the disk player comprising:

a pair of first contact members installed in the main body of the disk player and being movable closer to each other and away from each other, said pair of first contact members being moved away from each other by being pressed by the outer peripheral surface of the front portion of the disk inserted into the main body of the disk player;

elastic means for elastically biasing said first contact members closer to each other, so that the disk is accommodated at a first position in the main body by pressing the outer peripheral surface of the rear portion of the disk while said first contact members get closer to each other after being moved away from each other;

a second contact member being in contact with the outer peripheral surface of the front portion of the disk accommodated at the first position, said second contact member supporting the disk at the first position together with said first contact members;

disk loading/unloading means for moving said first contact members and said second contact member, for loading the disk supported at the first position into a second position at which the disk is clamped by the clamping device, and for unloading the disk positioned at the second position into the first position; and a pair of guide members installed in the main body, each guide member of said pair of guide members getting closer to or more distant from each other at both sides of a disk insertion direction, each guide member including a guide slit elongated in the disk insertion direction, each guide slit slidably fitting the edge of the disk, and each said guide member supporting the disk while said guide members get closer to each other, wherein the disk loading/unloading means comprises:

a pair of rotating members rotatably coupled to the main body and each including a free end on which each of said first contact members is fixed, a second rotating member rotatably coupled to the main body and including a free end on which said second contact member is fixed, a slider slidably installed with respect to the main body and comprising:

first cams coupled to said first contact members;

a second cam coupled to said second contact member so that said first and second contact members move during sliding of the slider;

a pair of guide member driving cams coupled to said guide members so that said pair of guide members moves in a direction in which said guide members get closer to and more distant from each other while said slider reciprocates, and a motor sliding said slider.

6. A disk player loading or unloading a disk having a front portion including an outer peripheral surface and a rear portion having an outer peripheral surface, the front portion being received by the disk player ahead of the rear portion during the loading of the disk, the disk player including a main body including a clamping device clamping the disk inserted into the main body, the disk player comprising:

a pair of first contact members installed in the main body of the disk player and being movable closer to each other and away from each other, said pair of first contact members being moved away from each other by being pressed by the outer peripheral surface of the front portion of the disk inserted into the main body of the disk player;

a spring elastically biasing said first contact members closer to each other, so that the disk is accommodated at a first position in the main body by pressing the outer peripheral surface of the rear portion of the disk while said first contact members get closer to each other after being moved away from each other;

a second contact member being in contact with the outer peripheral surface of the front portion of the disk accommodated at the first position, said second contact member supporting the disk at the first position together with said first contact members; and a disk loading/unloading unit moving said first contact members and said second contact member, loading the disk supported at the first position into a second position at which the disk is clamped by the clamping device, and unloading the disk positioned at the second position into the first position, wherein each of said first contact members moves towards each other and moves around the outer peripheral surface of the disk as the disk moves to the first position due to said first contact members pressing against the outer peripheral surface of the rear portion of the disk.

7. An apparatus to load and unload a disk having a front portion and a rear portion, the front portion being received by the apparatus ahead of the rear portion during the loading of the disk, comprising:

means for clamping the disk in the center thereof at a clamping position;

first contact members;

a second contact member;

an elastic mechanism, wherein said elastic mechanism biases said first contact members so as to compressively support the disk by the edge in cooperation with said second contact member at a first position;

guide members, each said guide member being separate from said first and second contact members and including a guide slit that is both elongated in a disk insertion direction and slidably fits the edge of the disk; and a loading mechanism to move the supported disk between the first position and the clamping position, wherein said guide members provide support to the disk by the edge, each of said first contact members moves towards each other and moves around an outer peripheral edge of the disk as the disk moves to the first position due to said first contact members pressing against an outer peripheral edge of the rear portion of the disk, and said clamping means clamps the disk at the clamping position after the disk is compressively supported using said first contact members and said second contact member.

8. The apparatus according to claim 7, wherein said elastic mechanism comprises a spring.

9. The apparatus of claim 7, further comprising a loading device to move the disk from the first position to be clamped.

10. The apparatus of claim 7, wherein said elastic mechanism connects two of said second contact member and said first contact members.

11. The apparatus of claim 7, wherein said elastic mechanism does not bias said guide members.

12. The apparatus of claim 7, wherein said guide members remain stationary as each of said first contact members move towards each other and move around the outer peripheral edge of the disk as the disk moves to the first position.

13. An apparatus to load and unload a disk having a front portion including an outer peripheral surface and a rear portion having an outer peripheral surface, the front portion being received by the apparatus ahead of the rear portion during the loading of the disk, comprising:

a main body including a clamping device clamping the disk inserted into the main body, a pair of first contact members installed in the main body of the disk player and being movable closer to each other and away from each other, the pair of first contact members being moved away from each other by being pressed by the outer peripheral surface of the front portion of said disk inserted into the main body of said disk player, a spring elastically biasing the first contact members closer to each other, so that said disk is accommodated at a first position in the main body by pressing the outer peripheral surface of the rear portion of said disk while the first contact members get closer to each other after being moved away from each other, a second contact member being in contact with the outer peripheral surface of the front portion of said disk accommodated at the first position, the second contact member supporting said disk at the first position together with the first contact members, and a disk loading/unloading unit moving the first contact members and the second contact member, loading said disk supported at the first position into a second position at which said disk is clamped by the clamping device, and unloading said disk positioned at the second position into the first position, wherein each of the first contact members moves towards each other and moves around the outer peripheral surface of the disk as the disk moves to the first position due to the first contact members pressing against the outer peripheral surface of the rear portion of the disk.

14. A method of loading a disk, a front portion of the disk being received by an apparatus ahead of a rear portion of the disk during the loading of the disk, comprising:

moving first contact members towards each other and around an outer peripheral surface of the disk as the disk moves to a first position due to the first contact members pressing against the outer peripheral surface of the rear portion of the disk;

supporting the disk by the edge of the disk using guide members having guide slits provided in the disk player, and compressively using first contact members and a second contact member at the first position when the disk is not clamped by a clamping unit; and moving the supported disk to a second position at which the disk is clamped by the clamping unit, wherein the guide members are separate from the first and second contact members.

15. An apparatus for loading a disk having a front portion and a rear portion, the front portion being received by the apparatus ahead of the rear portion during the loading of the disk, comprising:

a clamping device clamping a center of the disk at a clamping position;

first contact members biased to press against the rear portion of the disk compressively supporting an outer peripheral edge of the disk in cooperation with a second contact member at a first position;

a spring biasing said first contact members toward each other; and a loading device to move the disk while being compressively supported by said first and second contact members between the first position and the clamping position, wherein each of said first contact members moves towards each other and moves around the outer peripheral surface of the disk as the disk moves to the first position due to said first contact members pressing against the outer peripheral surface of the rear portion of the disk.

16. The apparatus of claim 15, wherein said first and second contact members do not move relative to one another while said loading device moves the disk.

17. The apparatus of claim 15, further comprising guide members that provide support to the disk by the edge while at the first position.

18. The apparatus of claim 17, wherein said spring does not bias said guide members.

19. The apparatus of claim 17, wherein said first and second contact members do not move relative to one another while said loading device moves the disk.

20. The apparatus of claim 15, wherein said spring connects two of said second contact member and said first contact members.

* * * * *